(12) United States Patent
Bantukul (10) Patent No.: US 9,537,904 B2
(45) Date of Patent: Jan. 3, 2017

(54) METHODS, SYSTEMS, AND COMPUTER READABLE MEDIA FOR USING POLICY KNOWLEDGE OF OR OBTAINED BY A POLICY AND CHARGING RULES FUNCTION (PCRF) FOR NEEDS BASED FORWARDING OF BEARER SESSION TRAFFIC TO NETWORK NODES

(71) Applicant: Tekelec, Inc., Morrisville, NC (US)

(72) Inventor: Apirux Bantukul, Cary, NC (US)

(73) Assignee: Tekelec, Inc., Morrisville, NC (US)

(\*) Notice: Subject to any disclaimer, the term of this patent is extended or adjusted under 35 U.S.C. 154(b) by 0 days.

(21) Appl. No.: 13/749,655

(22) Filed: Jan. 24, 2013

(65) Prior Publication Data

US 2014/0204796 A1      Jul. 24, 2014

(51) Int. Cl.
*H04L 29/08*      (2006.01)
*H04L 29/06*      (2006.01)
(Continued)

(52) U.S. Cl.
CPC ....... *H04L 65/1069* (2013.01); *H04L 41/0893* (2013.01); *H04L 65/1016* (2013.01); *H04L 43/028* (2013.01)

(58) Field of Classification Search
None
See application file for complete search history.

(56) References Cited

U.S. PATENT DOCUMENTS 7,522,517 B1    4/2009  Johnson
8,665,717 B2 *  3/2014  Kotecha et al. ........... 370/230.1
(Continued)

FOREIGN PATENT DOCUMENTS

KR    10-2009-0033968    4/2009
KR    10-2012-0055955    6/2012
(Continued)

OTHER PUBLICATIONS

Introduction to Evolved Packet Core; Alcatel-Lucent, 2009;Strategic White Paper.*
(Continued)

*Primary Examiner* — Huy D Vu
*Assistant Examiner* — Hong Shao
(74) *Attorney, Agent, or Firm* — Jenkins, Wilson, Taylor & Hunt, P.A.

(57) ABSTRACT

The subject matter described herein includes methods, systems, and computer readable media for using policy knowledge of or obtained by a policy and charging rules function (PCRF) for needs based forwarding of bearer session traffic to network nodes. One exemplary system includes a PCRF. The PCRF includes a policy engine for identifying, using policy knowledge or obtained by the PCRF, zero or more network nodes hosting applications needed for processing packets of a bearer session. The PCRF further includes an application routing configurator for providing instructions to configure at least one configurable network element to forward bearer session traffic to any of the network nodes determined to be needed for processing packets associated with the bearer session and to bypass any of the network nodes not determined to be needed for processing packets associated with the bearer session.

17 Claims, 3 Drawing Sheets

(51) Int. Cl.
  *H04L 12/24* (2006.01)
  *H04L 12/26* (2006.01)

(56) References Cited

U.S. PATENT DOCUMENTS

| | | | |
|---|---|---|---|
| 9,298,515 | B2 | 3/2016 | McMurry et al. |
| 9,369,390 | B2 | 6/2016 | Bantukul et al. |
| 9,391,897 | B2 | 7/2016 | Sparks et al. |
| 9,398,492 | B2 | 7/2016 | Deo |
| 2002/0091810 | A1 | 7/2002 | Hundscheidt et al. |
| 2004/0199632 | A1 | 10/2004 | Romero et al. |
| 2009/0232011 | A1 | 9/2009 | Li et al. |
| 2009/0327079 | A1 | 12/2009 | Parker et al. |
| 2010/0080172 | A1 | 4/2010 | Jin et al. |
| 2010/0103861 | A1* | 4/2010 | Ulupinar et al. ............. 370/315 |
| 2011/0090900 | A1 | 4/2011 | Jackson et al. |
| 2011/0131332 | A1 | 6/2011 | Bouazizi |
| 2011/0200053 | A1 | 8/2011 | Kanode et al. |
| 2011/0202676 | A1 | 8/2011 | Craig et al. |
| 2012/0123870 | A1 | 5/2012 | Denman et al. |
| 2012/0140665 | A1* | 6/2012 | Li et al. ........................ 370/252 |
| 2012/0158994 | A1 | 6/2012 | McNamee et al. |
| 2012/0300615 | A1* | 11/2012 | Kempf et al. ................ 370/216 |
| 2012/0303835 | A1 | 11/2012 | Kempf et al. |
| 2013/0003745 | A1 | 1/2013 | Nishimura |
| 2013/0044645 | A1* | 2/2013 | Castro Castro et al. ..... 370/259 |
| 2013/0064093 | A1 | 3/2013 | Ridel et al. |
| 2013/0086279 | A1* | 4/2013 | Archer et al. ................ 709/233 |
| 2013/0173810 | A1 | 7/2013 | Subramaniam |
| 2013/0188489 | A1 | 7/2013 | Sato |
| 2013/0223219 | A1 | 8/2013 | Mir et al. |
| 2013/0250770 | A1 | 9/2013 | Zou et al. |
| 2013/0343295 | A1 | 12/2013 | Deo |
| 2014/0059678 | A1* | 2/2014 | Parker ............................ 726/22 |
| 2014/0105039 | A1* | 4/2014 | McDysan ........... H04L 41/5051 370/252 |
| 2014/0105140 | A1 | 4/2014 | Guo |
| 2014/0172739 | A1 | 6/2014 | Anderson et al. |
| 2014/0189137 | A1* | 7/2014 | Castro Castro et al. ..... 709/228 |
| 2014/0192646 | A1 | 7/2014 | Mir et al. |
| 2014/0193154 | A1 | 7/2014 | Graham et al. |
| 2014/0233389 | A1 | 8/2014 | Bantukul et al. |
| 2014/0237111 | A1 | 8/2014 | McMurry et al. |
| 2014/0304416 | A1 | 10/2014 | Khasnabish |
| 2014/0310388 | A1 | 10/2014 | Djukic et al. |
| 2014/0348068 | A1 | 11/2014 | Morper et al. |
| 2015/0036505 | A1 | 2/2015 | Sparks et al. |
| 2015/0149656 | A1 | 5/2015 | McMurry et al. |

FOREIGN PATENT DOCUMENTS

| | | |
|---|---|---|
| KR | 10-2012-0059542 | 6/2012 |
| WO | WO 2011/161575 A1 | 12/2011 |
| WO | WO 2012/055446 A1 | 5/2012 |
| WO | WO 2012/063106 A1 | 5/2012 |
| WO | WO 2012/130264 A1 | 10/2012 |
| WO | WO 2012/149954 A1 | 11/2012 |
| WO | WO 2012/160465 A1 | 11/2012 |
| WO | WO 2013/188665 A1 | 12/2013 |
| WO | WO 2014/127346 A1 | 8/2014 |
| WO | WO 2014/127347 A1 | 8/2014 |
| WO | WO 2015/017422 A1 | 2/2015 |
| WO | WO 2015/080906 A1 | 6/2015 |

OTHER PUBLICATIONS

Commonly-assigned, co-pending U.S. Appl. No. 13/917,200 for "Methods, Systems, and Computer Readable Media for Providing Policy and Charging Rules Function (PCRF) with Integrated Openflow Controller," (Unpublished, filed Jun. 13, 2013).

3rd Generation Partnership Project, "Technical Specification Group Services and System Aspects; Policy and charging control architecture (Release 9)," 3GPP TS 23.203 V9.3.0 (Dec. 2009).

"OpenFlow Switch Specification," Version 1.1.0 Implemented (Wire Protocol 0x02), www.openflow.org, pp. 1-56 (Feb. 28, 2011).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion of the International Searching Authority, or the Declaration for International Application No. PCT/US2014/048644 (Oct. 17, 2014).

Commonly-assigned, co-pending International Application No. PCT/US14/48644 for "Methods, Systems, and Computer Readable Media for Mitigating Traffic Storms," (Unpublished, filed Jul. 29, 2014).

Notification of Transmittal of the International Search Report and the Written Opinion of the International Searching Authority, or the Declaration for International Application No. PCT/US2014/016853 (Jun. 6, 2014).

Notification of Transmittal of the International Search Report and the Written Opinion of the International Searching Authority, or the Declaration for International Application No. PCT/US2014/016860 (Jun. 4, 2014).

Notification of Transmittal of the International Search Report and the Written Opinion of the International Searching Authority, or the Declaration for International Application No. PCT/US2014/011551 (Apr. 28, 2014).

Notification of Transmittal of the International Search Report and the Written Opinion of the International Searching Authority, or the Declaration for International Application No. PCT/US2013/045652 (Sep. 17, 2013).

Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).

"3rd Generation Partnership Project; Technical Specification Group Services and System Aspects; Policy and charging control architecture (Release 11)," 3GPP TS 23.203, V11.8.0 pp. 1-179 (Dec. 2012).

Fajardo et al., "Diameter Base Protocol," RFC 6733, pp. 1-152 (Oct. 2012).

"Software-Defined Networking: The New Norm for Networks," ONF White Paper, Open Networking Foundation, pp. 1-12 (Apr. 13, 2012).

"OpenFlow Switch Specification," https://www.opennetworkin.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Chapman et al., "Software architecture definition for on-demand cloud provisioning," Cluster Computing, vol. 15, No. 2, pp. 79-100 Feb. 27, 2011).

Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).

Communication of European Publication Number and Information on the Application of Article 67(3) EPC for European Application No. 13804779.0 (Mar. 25, 2015).

Non-Final Office Action for U.S. Appl. No. 13/917,200 (Mar. 16, 2015).

Applicant-Initiated Interview Summary for U.S. Appl. No. 13/956,304 (Aug. 5, 2015).

Applicant-Initiated Interview Summary for U.S. Appl. No. 13/917,200 (Jul. 27, 2015).

Notification of Transmittal of the International Search Report and the Written Opinion of the International Searching Authority, or the Declaration for International Application No. PCT/US2014/066240 (May 13, 2015).

Non-Final Office Action for U.S. Appl. No. 13/956,304 (May 4, 2015).

"Split Architecture for Large Scale Wide Area Networks," SPARC ICT-258457 Deliverable D3.3, pp. 1-129 (Dec. 1, 2011).

Notice of Allowance and Fee(s) Due for U.S. Appl. No. 13/917,200 (Mar. 28, 2016).

(56) References Cited

OTHER PUBLICATIONS

Notice of Allowance and Fee(s) Due for U.S. Appl. No. 13/956,304 (Mar. 16, 2016).
Notice of Allowance and Fee(s) Due for U.S. Appl. No. 14/182,864 (Feb. 17, 2016).
Applicant-Initiated Interview Summary for U.S. Appl. No. 13/956,304 (Feb. 1, 2016).
Extended European Search Report for European Application No. 13804779.0 (Jan. 19, 2016).
Advisory Action Before the Filing of an Appeal Brief and AFCP 2.0 Decision for U.S. Appl. No. 13/917,200 (Jan. 14, 2016).
Applicant-Initiated Interview Summary for U.S. Appl. No. 14/092,898 (Jan. 14, 2016).
Applicant-Initiated Interview Summary for U.S. Appl. No. 14/182,864 (Dec. 16, 2015).
Supplemental Notice of Allowability for U.S. Appl. No. 14/182,800 (Dec. 1, 2015).
Communication of European Publication Number and Information on the Application of Article 67(3) EPC for European Patent Application No. 14710682.7 (Nov. 25, 2015).
Notice of Allowance and Fee(s) Due for U.S. Appl. No. 14/182,800 (Nov. 10, 2015).
Communication of European Publication Number and Information on the Application of Article 67(3) EPC for European Patent Application No. 14703974.7 (Nov. 4, 2015).
Final Office Action for U.S. Appl. No. 13/956,304 (Nov. 3, 2015).
Final Office Action for U.S. Appl. No. 13/917,200 (Oct. 22, 2015).
Non-Final Office Action for U.S. Appl. No. 14/092,898 (Oct. 8, 2015).
Non-Final Office Action for U.S. Appl. No. 14/182,864 (Sep. 23, 2015).
"LTE QoS: SDF and EPS Bearer Qos," Netmanias, http://www.netmanias.com/en/post/techdocs/5908/eps-lte-qos-sdf/lte-qos-sdf-and-eps-bearer-qos, pp. 1-17 (Sep. 11, 2013, downloaded Apr. 8, 2015).
Kempf et al., "Moving the Mobile Evolved Packet Core to the Cloud," 2012 Fifth International Workshop on Selected Topics in Mobile and Wireless Computing, pp. 1-8 (Oct. 8, 2012).
Li Erran et al., "CellSDN: Software-Defined Cellular Networks," ftp://ftp.cs.princeton.edu/techeports/2012/922.pdf, pp. 1-6 (Apr. 20, 2012).
Commonly-assigned, co-pending U.S. Appl. No. 14/711,761 for "Methods, Systems, and Computer Readable Media for Session Based Software Defined Networking (SDN) Management," (Unpublished, filed May 13, 2015).
Communication of European Publication Number and Information on the Application of Article 67(3) EPC for European Patent Application No. 14755208.7 (May 11, 2016).

\* cited by examiner

METHODS, SYSTEMS, AND COMPUTER READABLE MEDIA FOR USING POLICY KNOWLEDGE OF OR OBTAINED BY A POLICY AND CHARGING RULES FUNCTION (PCRF) FOR NEEDS BASED FORWARDING OF BEARER SESSION TRAFFIC TO NETWORK NODES

TECHNICAL FIELD

The subject matter described herein relates to providing services to bearer traffic. More particularly, the subject matter described herein relates to methods, systems, and computer readable media for using policy knowledge of or obtained by a PCRF for needs based forwarding of bearer session traffic to network nodes.

BACKGROUND

In packet networks, packets originating from a mobile device, such as a mobile handset, have to pass through many network nodes hosting different applications before reaching the Internet or other transit network. For example, packet data originating from a mobile device may pass through an e-node B, a signaling gateway (SGW), a packet gateway (PGW), a deep packet inspection device (DPI), a video over packet (VoP) device, and a content filter before reaching the Internet. Packet delay increases with each network node in the bearer path. In addition, each network node must be scaled to handle 100% of the bearer traffic even though only a portion of the bearer traffic needs its services. As a result of this scaling, the cost of each network node is increased.

Accordingly, in light of these difficulties, there exists a need for methods, systems, and computer readable media for using policy knowledge of or obtained by a PCRF for needs based forwarding of bearer traffic to network nodes.

SUMMARY

The subject matter described herein includes methods, systems, and computer readable media for using policy knowledge of or obtained by a policy and charging rules function (PCRF) for needs based forwarding of bearer traffic to network nodes. One exemplary system includes a PCRF. The PCRF includes a policy engine for identifying, using policy knowledge or obtained by the PCRF, zero or more network nodes hosting applications needed for processing packets of a bearer session. The PCRF further includes an application routing configurator for providing instructions to configure at least one configurable network element to forward bearer session traffic to any of the network nodes determined to be needed for processing packets associated with the bearer session and to bypass any of the network nodes not determined to be needed for processing packets associated with the bearer session.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with respect to the accompanying drawings, of which.

DETAILED DESCRIPTION

Figure 1:
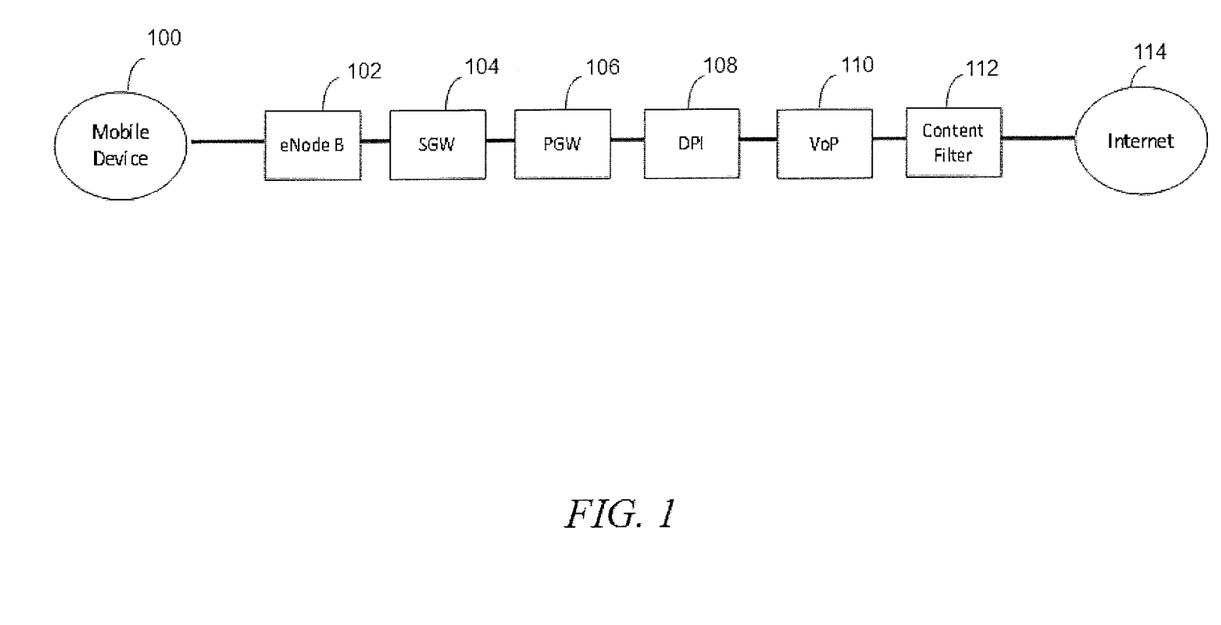
FIG. 1 is a network diagram illustrating exemplary network nodes through which packets of a bearer session may pass.

The subject matter described herein includes methods, systems, and computer readable media for using policy knowledge of or obtained by a PCRF for needs based forwarding of bearer session traffic to network nodes. FIG. 1 is a block diagram illustrating exemplary network nodes through which bearer session traffic may pass, whether or not the traffic for a given session needs the services of one or more of the network nodes. Referring to FIG. 1, traffic originating from a mobile device passes through an e-node B 102, an SGW 104, a PGW 106, a DPI device 108, a VoP device 110, and a content filter 112 before reaching Internet 114. Because there is no mechanism in the network configuration illustrated in FIG. 1 for dynamically configuring the routing or forwarding of bearer session traffic to one or more of nodes 108, 110, and 112 on an as needed basis, packet traffic from mobile device 100 must pass through all of these network elements. Such a configuration increases packet delay and the expense associated with each network node.

Figure 2:
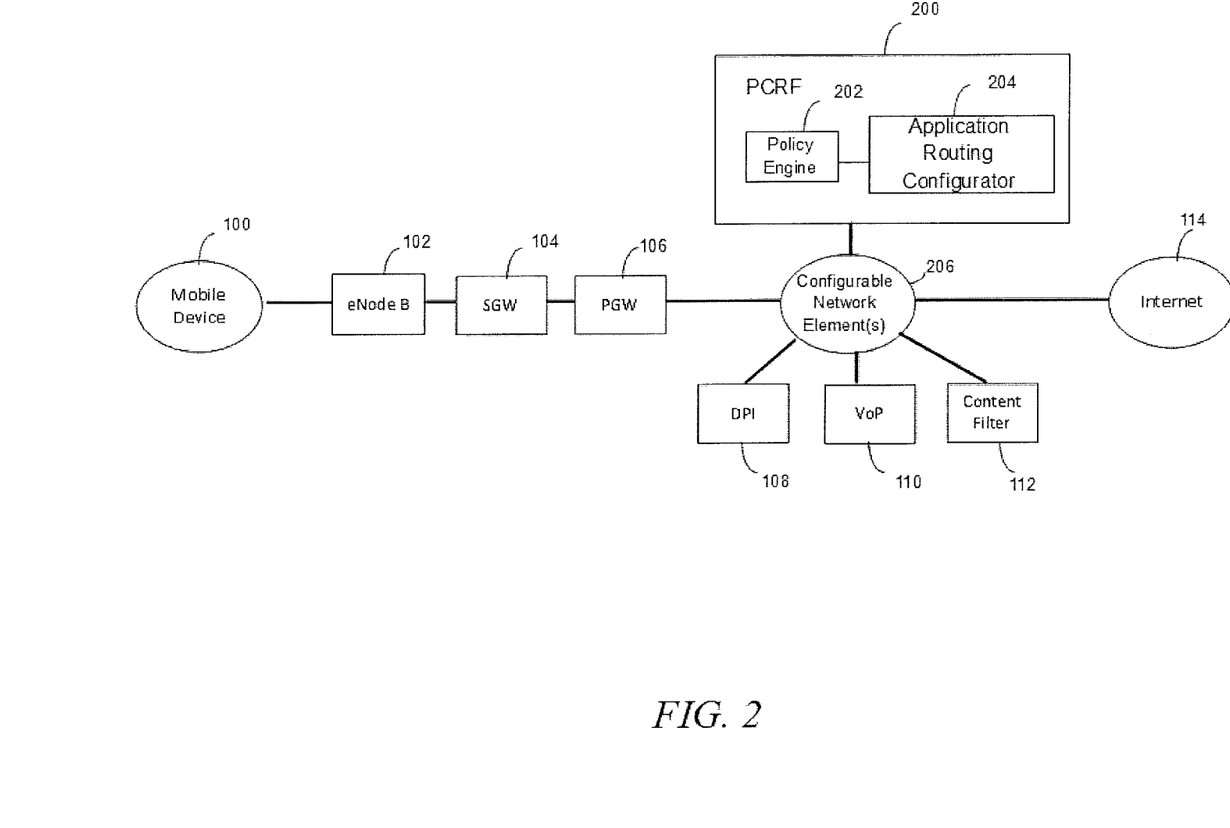
FIG. 2 is a network diagram illustrating a system for using policy knowledge of or obtained by a PCRF for needs based forwarding of bearer session traffic to network nodes according to an embodiment of the subject matter described herein.

In light of these difficulties, a system that uses policy knowledge of or obtained by a PCRF to dynamically configure a network switch, router, application, or other network entity to forward bearer session traffic to one or more of network nodes 108, 110, and 112 on an as needed basis is provided. FIG. 2 illustrates such a system. In FIG. 2, a PCRF 200 includes a policy engine 202 and an application routing configurator 204. Policy engine 202 determines, using policy knowledge of or obtained by PCRF 200, which of network nodes 108, 110, and 112 should be used for a given bearer session and/or which of network nodes 108, 110, and 112 should be bypassed for the bearer session. Application routing configurator 204 dynamically configures one or more configurable network elements 206 to forward bearer session traffic to nodes identified as needed for a given bearer session.

As stated above, policy engine 202 may determine which network nodes should receive traffic for a given bearer session using policy knowledge stored or obtained by PCRF 200. For example, when e-node B 102 or other network element initiates a session, the policy charging and enforcement function associated with the session initiating network element must consult PCRF 200 to determine what policy to apply to the session. PCRF 200, using policy engine 202, identifies the subscriber associated with the bearer session, accesses stored policy rules associated with the subscriber and bearer session type, determines, using the policy rules for the subscriber and bearer session type, that one or more of network nodes 108, 110, and 112 may be required for a given session. The policy rules may be stored within memory of the PCRF or within memory of a node accessible by the PCRF. One example of an external node accessible by the PCRF that may store policy rules is a subscription profile repository (SPR). Another example of an external node accessible by the PCRF that may store policy rules is a home subscriber server (HSS). In the case where the policy rules are stored externally to the PCRF, the PCRF may query the SPR or the HSS to identify network nodes hosting applications needed to process packets for a session. If the policy rules are stored internally by the PCRF 200, policy engine 202 may query the policy database maintained by the PCRF to identify the network nodes hosting applications needed to process packets for the session.

Once PCRF 200 identifies the network node or nodes needed to processor packets for a given session, PCRF 200 may instruct the identified network nodes 108, 110, and 112 to look for packets associated with the session and also how to process packets for the session. Because PCRF 200 knows which of network nodes 108, 110, and 112 are needed for a given session, application routing configurator 204 may utilize this knowledge to configure one or more configurable network elements 206 to dynamically configure one or more configurable network elements to forward traffic for a given bearer session to needed network nodes and to bypass network nodes that are not needed for the session.

Because network nodes determined not to be needed for a bearer session are bypassed, packet delay is minimized by only bringing in the needed network nodes for each bearer session. Moreover, each network node only has to be scaled or designed to handle expected traffic, rather than all packet traffic. For example, 30% of the traffic may not need any additional processing and only flow through e-node B, SOW, and the PGW. 20% may need video optimization. 20% may need content filtering, and 30% may need DPI. PCRF 200 may, using policy knowledge, dynamically configure one or more configurable network elements to forward bearer session traffic to needed network nodes thereby implement these percentages. By dynamically steering session traffic to needed network nodes and bypassing unneeded network nodes, network efficiency is increased.

In one embodiment, application routing configurator 204 may be an OpenFlow controller and configurable network elements 206 may be OpenFlow compatible switches. The OpenFlow protocol is described in the OpenFlow Switch Specification, Version 1.1.0 Implemented (Wire Protocol 0x02), Feb. 28, 2011, the disclosure of which is incorporated herein by reference in its entirety. In order to dynamically configure one or configurable network elements to forward bearer session traffic to needed network elements, application routing configurator 204 may send OpenFlow flow table modification commands to network elements 206 to add or modify flow table entries in their flow tables so that packets in a session are forwarded to the network elements identified as needed for the session and so that the packets bypass network elements that are not identified as needed for the session. In one exemplary implementation where configurable network elements 206 are implemented by an OpenFlow switch, the OpenFlow switch may have a port corresponding to each of PCRF 200, PGW 106, DPI device 108, VoP device 110, content filter 112, and Internet 114. Each of network elements 108, 110, and 112 may be configured to forward packets received from the OpenFlow switch back to the OpenFlow switch after processing. Assume for illustrative purposes that a given session is determined to require processing by DPI device 108 and content filter 112 but not VoP device 110. In this example, PCRF 200 may configure the flow table or flow tables associated with the OpenFlow switch as illustrated in Table 1 below.

TABLE 1

Example Flow Table Configuration to Implement Needs Based Forwarding of Bearer Traffic to Network Nodes

| Match Fields | | |
|---|---|---|
| Ingress Port | Session ID | Instructions |
| PGW | $IP_1$ | Output to DPI |
| DPI | $IP_1$ | Output to Content Filter |
| Content Filter | $IP_1$ | Output to Internet |

The flow table includes match fields that are compared to fields in ingress packets and instructions to execute for packets matching each combination of match fields. If the ingress port corresponds to PGW 106, and the session ID is $IP_1$ (or other session identifying parameters), the instruction is to output the packets to the port associated with the DPI. Thus, ingress packets for session $IP_1$ received from PGW 106 will be forwarded to DPI device 108. Assuming DPI device 108 is configured to forward packets back to the OpenFlow switch, according to the flow table, the packets received on the ingress port that corresponds to the DPI having the session ID $IP_1$ will be output to the port associated with the content filter. Assuming that the packets pass the content filter and are forwarded back to the OpenFlow switch, according to the next flow table entry, packets received on the ingress port associated with the content filter having the session ID $IP_1$ will be output to the Internet. Thus, using the dynamically configured flow table illustrated above, packets associated with the session identified by $IP_1$ are processed by the DPI and the content filter but not the VoP device. Such dynamic configuration of network forwarding or routing to forward traffic to only the needed network nodes using the policy knowledge of the PCRF reduces the need to over-engineer network nodes to handle traffic that the nodes are not required to process.

Figure 3:
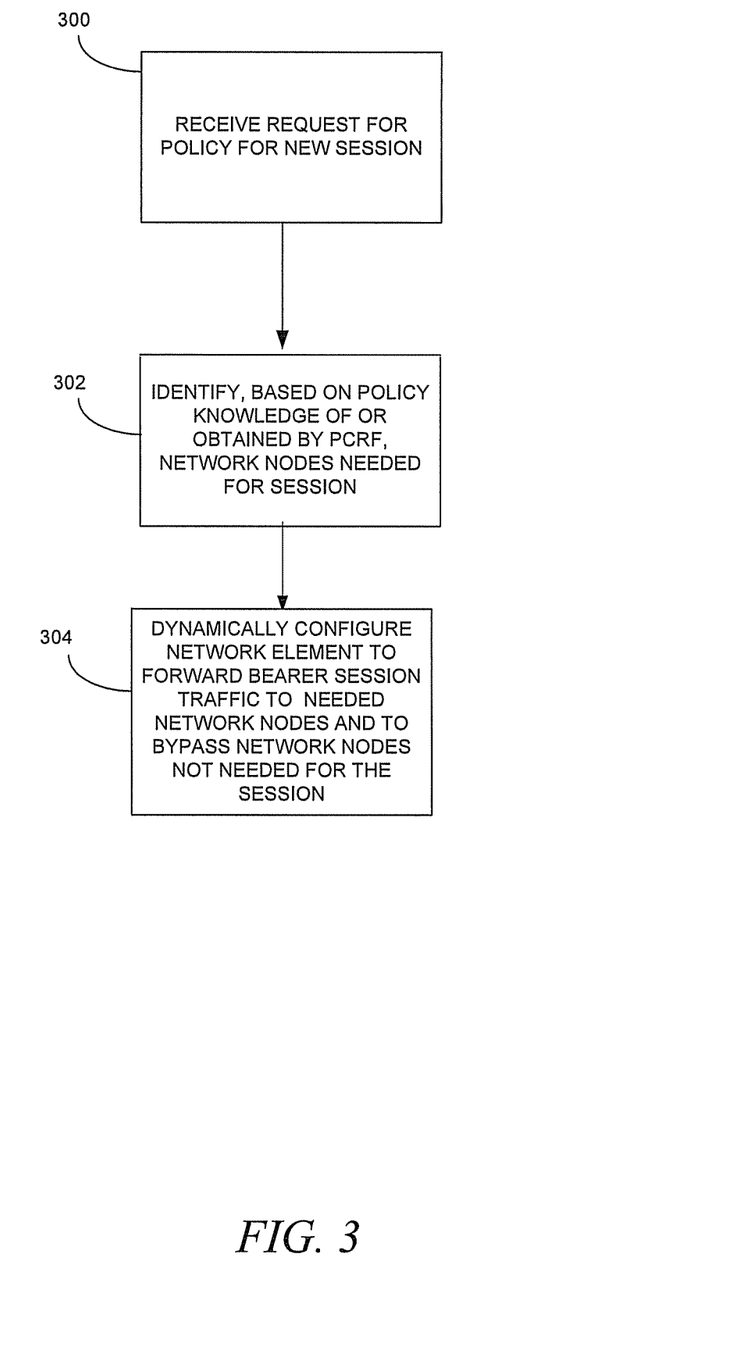
FIG. 3 is a flow chart illustrating a process for using policy knowledge of or obtained by a PCRF for needs based forwarding of bearer session traffic to network nodes according to an embodiment of the subject matter described herein.

FIG. 3 is a flow chart illustrating exemplary steps for using policy knowledge of a policy and charging rules function for needs-based forwarding of bearer session traffic to network nodes according to an embodiment of the subject matter described herein. Referring to FIG. 3, in step 300, a policy request for a new session is received. For example, PCRF 200 illustrated in FIG. 2 may receive a policy request from e-node B 102 via SGW 104 and PGW 106 or other node (such as an application function (AF)) desiring to establish a session involving mobile device 100. In step 302, PCRF 200 identifies, using policy knowledge of or obtained by the PCRF, network nodes needed to process packets associated with the bearer session. For example, PCRF 200 may identify zero or more of DPI, VoP, and content filter 112 needed for processing packets associated with a session using stored policy instructions for a mobile device 100. In step 304, PCRF 200 configures configurable network elements 206 to forward bearer traffic from the session to the needed network elements and to bypass network elements not needed for the bearer session. As stated above, in one implementation, this configuration may be achieved by modifying the flow tables of an OpenFlow switch or switches to forward session packets to needed network elements and to bypass unneeded network elements.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for using policy knowledge of or obtained by a policy and charging rules function (PCRF) for needs based forwarding bearer session traffic to network nodes, the system comprising:
    a PCRF including:
        a policy engine for identifying, using policy knowledge of or obtained by the PCRF, at least one of a deep packet inspection (DPI) device, a video over packet (VoP) device, and a content filter hosting applications of different types needed for processing packets of a bearer session;
        an application routing configurator for providing instructions to configure at least one configurable network element to forward bearer session traffic to any of the DPI device, the VoP device, and the content filter identified as hosting applications identified as needed for processing packets associated with the session or to bypass any of the DPI device, the VoP device, and the content filter not identified as needed for processing packets associated with the session;
        wherein the application routing configurator comprises an OpenFlow compatible controller integrated within the PCRF;
        wherein the at least one configurable network element comprises an OpenFlow compatible switch separate from the DPI device, the VoP device, and the content filter identified as hosting the applications identified as needed for processing the packets in the bearer session; and
        wherein the instructions to configure the at least one configurable network element comprise at least one OpenFlow compatible command including parameters for identifying packets in the bearer session and an action to perform for matching packets that directs the OpenFlow compatible switch to forward the matching packets only to the DPI device, the VoP device, and the content filter identified as hosting applications identified as needed for processing the matching packets and thereby to bypass at least one of the DPI device, the VoP device, and the content filter not identified as needed to process the matching packets and wherein the at least one OpenFlow compatible command triggers the OpenFlow compatible switch to configure a flow table in the switch with entries for forwarding the packets in the bearer session received on a first port of the OpenFlow compatible switch to a first one of the DPI device, the VoP device, and the content filter hosting an application of a first type and to forward the packets in the bearer session received on a second port of the OpenFlow compatible switch to a second one of the DPI device, the VoP device, and the content filter hosting an application of a second type different from the first type, wherein the packets in the bearer session received on the second port of the OpenFlow compatible switch are received from the first one of the DPI device, the VoP device, and the content filter after the packets are processed by the first one of the DPI device, the VoP device, and the content filter.

2. The system of claim 1 wherein the policy engine is configured to determine whether the DPI device is needed for a session, and, in response to determining that the DPI device is needed for a session, the application routing configurator is configured to provide instructions to the at least one configurable network element to dynamically configure the at least one configurable network element to forward traffic from the bearer session to the DPI device.

3. The system of claim 2 wherein, in response to determining that 3. the DPI device is not needed for a session, the application routing configurator is configured to provide instructions to the at least one configurable network element to dynamically configure the at least one configurable network element to forward traffic from the bearer session to bypass the DPI device.

4. The system of claim 1 wherein the policy engine is configured to determine whether the VoP device is needed for a session, and, in response to determining that the VoP device is needed for a session, the application routing configurator controller interface is configured to provide instructions to the at least one configurable network element to dynamically configure the at least one configurable network element to forward traffic from the bearer session to the VoP device.

5. The system of claim 4 wherein, in response to determining that the VoP device is not needed for a session, the application routing configurator is configured to provide instructions to the at least one configurable network element to dynamically configure the at least one configurable network element to forward traffic from the bearer session to bypass the VoP device.

6. The system of claim 1 wherein the policy engine is configured to determine whether the content filter is needed for a session, and, in response to determining that the content filter is needed for a session, the application routing configurator is configured to provide instructions to the at least one configurable network element to dynamically configure the at least one configurable network element to forward traffic from the bearer session to the content filter.

7. The system of claim 6, wherein, in response to determining that the content filter is not needed for the session, the application routing configurator is configured to provide instructions to the at least one configurable network element to dynamically configure the at least one configurable network element to forward traffic from the bearer session to bypass the content filter.

8. The system of claim 1 wherein the application routing configurator is to configured to dynamically configure the at least one configurable network element to forward traffic from the bearer session to only the DPI device, the VoP device, and the content filter identified as hosting applications identified as needed for processing packets associated with the session and to thereby bypass the DPI device, the VoP device, and the content filter determined not to be needed for the bearer session.

9. A method for using policy knowledge of or obtained by a policy and charging rules function (PCRF) for needs based forwarding of bearer session traffic to network nodes, the method comprising:
    at a policy and charging rules function (PCRF):
        identifying, by a policy engine of the PCRF using policy knowledge of or obtained by the PCRF, at least one of a deep packet inspection (DPI) device, a video over packet (VoP) device, and a content filter hosting applications of different types needed for processing packets in a bearer session;

providing, from an application configurator of the PCRF, instructions to configure at least one configurable network element to forward bearer session traffic to any of the DPI device, the VoP device, and the content filter identified as hosting applications identified as needed for processing packets associated with the session or to bypass any of the DPI device, the VoP device, and the content filter not identified as needed for processing packets associated with the session, wherein the application routing configurator comprises an OpenFlow compatible controller integrated within the PCRF;

wherein the at least one configurable network element comprises an OpenFlow compatible switch separate from the DPI device, the VoP device, and the content filter identified as hosting the applications identified as needed for processing the packets in the bearer session; and wherein the instructions to configure the at least one configurable network element comprise at least one OpenFlow compatible command including parameters for identifying packets in the bearer session and an action to perform for matching packets that directs the OpenFlow compatible switch to forward the matching packets only to the DPI device, the VoP device, and the content filter identified as hosting applications identified as needed for processing the matching packets and thereby to bypass at least one of the DPI device, the VoP device, and the content filter not identified as needed to process the matching packets and wherein the at least one OpenFlow compatible command triggers the OpenFlow compatible switch to configure a flow table in the switch with entries for forwarding the packets in the bearer session received on a first port of the OpenFlow compatible switch to a first one of the DPI device, the VoP device, and the content filter hosting an application of a first type and to forward the packets in the bearer session received on a second port of the OpenFlow compatible switch to a second one of the DPI device, the VoP device, and the content filter hosting an application of a second type different from the first type, wherein the packets in the bearer session received on the second port of the OpenFlow compatible switch are received from the first one of the DPI device, the VoP device, and the content filter after the packets are processed by the first one of the DPI device, the VoP device, and the content filter.

10. The method of claim 9 wherein the policy engine is configured to determine whether the DPI device is needed for a session, and, in response to determining that the DPI device is needed for a session, the application routing configurator is configured to provide instructions to the at least one configurable network element to dynamically configure the at least one configurable network element to forward traffic from the bearer session to the DPI device.

11. The method of claim 10 wherein, in response to determining that the DPI device is not needed for a session, the application routing configurator interface is configured to provide instructions to the at least one configurable network element to dynamically configure the at least one configurable network element to forward traffic from the bearer session to bypass the DPI device.

12. The method of claim 9 wherein the policy engine is configured to determine whether the VoP device is needed for a session, and, in response to determining that the VoP device is needed for a session, the application routing configurator is configured to provide instructions to dynamically configure the at least one configurable network element to forward traffic from the bearer session to the VoP device.

13. The method of claim 12 wherein, in response to determining that the VoP device is not needed for a session, the application routing configurator is configured to provide instructions to the at least one configurable network element to dynamically configure the at least one configurable network element to forward traffic from the bearer session to bypass the VoP device.

14. The method of claim 9 wherein the policy engine is configured to determine whether the content filter is needed for a session, and, in response to determining that the content filter is needed for a session, the application routing configurator is configured to provide instructions to the at least one configurable network element to dynamically configure the at least one configurable network element to forward traffic from the bearer session to the content filter.

15. The method of claim 14, wherein, in response to determining that the content filter is not needed for the session, the application routing configurator is configured to provide instructions to the at least one configurable network element to dynamically configure the at least one configurable network element to forward traffic from the bearer session to bypass the content filter.

16. The method of claim 9 wherein the application routing configurator is configured to dynamically configure the at least one configurable network element to forward traffic from the bearer session to only the DPI device, the VoP device, and the content filter identified as hosting applications identified as needed for processing packets associated with the session and to thereby bypass the DPI device, the VoP device, and the content filter determined not to be needed for the bearer session.

17. A non-transitory computer readable medium having stored thereon executable instructions that when executed by the processor of a computer control the computer to perform steps comprising:

at a policy and charging rules function (PCRF):
identifying, by a policy engine of the PCRF using policy knowledge of or obtained by the PCRF, at least one of a deep packet inspection (DPI) device, a video over packet (VoP) device, and a content filter hosting an application of a different type needed for processing packets in a bearer session;

providing, from an application configurator of the PCRF, instructions to configure at least one configurable network element to forward bearer session traffic to any of the DPI device, the VoP device, and the content filter identified as hosting applications identified as needed for processing packets associated with the session or to bypass any of the DPI device, the VoP device, and the content filter not identified as needed for processing packets associated with the session, wherein the application routing configurator comprises an OpenFlow compatible controller integrated within the PCRF;

wherein the at least one configurable network element comprises an OpenFlow compatible switch separate from the DPI device, the VoP device, and the content filter identified as hosting the applications identified as needed for processing the packets in the bearer session; and wherein the instructions to configure the at least one configurable network element comprise at least one OpenFlow compatible command including parameters for identifying packets in the bearer session and an action to perform for matching packets that directs the OpenFlow compatible switch to forward the matching packets only to the DPI device, the VoP device, and the content filter identified as hosting applications identified as needed for processing the matching packets and thereby to bypass at least one of the DPI device, the VoP device, and the content filter not identified as needed to process the matching packets and wherein the at least one OpenFlow compatible command triggers the OpenFlow compatible switch to configure a flow table in the switch with entries for forwarding the packets in the bearer session received on a first port of the OpenFlow compatible switch to a first one of the DPI device, the VoP device, and the content filter hosting an application of a first type and to forward the packets in the bearer session received on a second port of the OpenFlow compatible switch to a second one of the DPI device, the VoP device, and the content filter hosting an application of a second type different from the first type, wherein the packets in the bearer session received on the second port of the OpenFlow compatible switch are received from the first one of the DPI device, the VoP device, and the content filter after the packets are processed by the first one of the DPI device, the VoP device, and the content filter.

* * * * *